United States Patent
Sumaki et al.

(10) Patent No.: US 8,961,290 B1
(45) Date of Patent: Feb. 24, 2015

(54) INFORMATION PROCESSING DEVICE AND NON-TRANSITORY COMPUTER-READABLE STORAGE MEDIUM STORING GAME PROGRAM

(71) Applicant: DeNA Co., Ltd., Tokyo (JP)

(72) Inventors: Yusuke Sumaki, Tokyo (JP); Takashi Okubo, Tokyo (JP); Riketsu Kyou, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/245,681

(22) Filed: Apr. 4, 2014

(30) Foreign Application Priority Data

Nov. 1, 2013 (JP) .................................. 2013-227959

(51) Int. Cl.
*A63F 13/00* (2014.01)

(52) U.S. Cl.
CPC .......... *A63F 13/00* (2013.01); *A63F 2300/6036* (2013.01); *A63F 2300/609* (2013.01)
USPC .............................................. 463/17; 463/10

(58) Field of Classification Search
CPC ... A63F 3/06; A63F 3/0605; A63F 2300/807; A63F 13/822
USPC ................. 463/10, 17, 21, 22, 9, 16
See application file for complete search history.

(56) References Cited

U.S. PATENT DOCUMENTS

| 7,314,407 B1 * | 1/2008 | Pearson ............................ 463/7 |
| 8,678,933 B2 | 3/2014 | Kobayashi |
| 2013/0288766 A1 * | 10/2013 | Terashima et al. .............. 463/16 |

FOREIGN PATENT DOCUMENTS

| JP | 2003-079955 A | 3/2003 |
| JP | 2009-148331 A | 7/2009 |
| JP | 5280579 B | 5/2013 |
| JP | 5228129 B | 7/2013 |

OTHER PUBLICATIONS

Japanese Patent Application No. 2013-227959: Office Action mailed on Jan. 14, 2014.

* cited by examiner

*Primary Examiner* — Omkar Deodhar
*Assistant Examiner* — Allen Chan
(74) *Attorney, Agent, or Firm* — Procopio, Cory, Hargreaves & Savitch LLP

(57) ABSTRACT

An information processing device performs area selection processing in which a first game point or a second game point specified by a player is consumed to select an area from among a plurality of areas based on the amount of consumption of the first game points or the second game points, wherein the range of selectable areas differs between a case where the first game point is consumed to select an area and a case where the second game point is consumed to select an area, and lottery processing in which a game content to be acquired by the player is selected by lottery, based on a drawing probability associated with the area selected.

6 Claims, 14 Drawing Sheets

FIG. 4

| CARD ID | CHARACTER NAME | CHARACTER IMAGE | RARITY | INITIAL ATTACK STRENGTH | INITIAL DEFENSE STRENGTH | INITIAL HIT POINT |
|---|---|---|---|---|---|---|
| 0001 | CHARACTER A | | COMMON | 15 | 8 | 10 |
| 0002 | CHARACTER B | | UNCOMMON | 30 | 20 | 15 |
| 0003 | CHARACTER C | | RARE | 45 | 30 | 25 |
| 0004 | CHARACTER D | | SUPER RARE | 60 | 55 | 60 |
| ... | ... | ... | ... | ... | ... | ... |

FIG. 5

| ITEM ID | ITEM NAME |
|---|---|
| 0001 | ITEM A |
| 0002 | ITEM B |
| 0003 | ITEM C |
| ⋮ | ⋮ |

FIG. 6

| DECK ID | DESIGN | MAIN CARD A | MAIN CARD B | SUB CARD A | SUB CARD B | SUB CARD C | SUB CARD D |
|---|---|---|---|---|---|---|---|
| 1 | BLUE ONLY | 1 | — | 9 | 10 | 10 | 10 |
| 2 | BLUE ★ | 1 | — | 9 | 10 | 10 | — |
| 3 | BLUE ★★ | 1 | — | 9 | 10 | — | — |
| 4 | BLUE ★★★ | 1 | — | 9 | — | — | — |
| 5 | RED ONLY | — | 1 | 9 | 10 | 10 | 10 |
| 6 | RED ★ | — | 1 | 9 | 10 | 10 | — |
| 7 | RED ★★ | — | 1 | 9 | 10 | — | — |
| 8 | RED ★★★ | — | 1 | 9 | — | — | — |
| 9 | YELLOW ONLY | 1 | 1 | 9 | 10 | 10 | 10 |
| 10 | YELLOW ★ | 1 | 1 | 9 | 10 | 10 | — |
| 11 | YELLOW ★★ | 1 | 1 | 9 | 10 | — | — |
| 12 | YELLOW ★★★ | 1 | 1 | 9 | — | — | — |

FIG. 7

| AREA ID | LEVEL 1 | LEVEL 2 | LEVEL 3 | ...... | LEVEL 10 |
|---|---|---|---|---|---|
| 1 | BLUE ONLY | RED ONLY | YELLOW ONLY | ...... | YELLOW ONLY |
| 2 | RED ONLY | BLUE ONLY | BLUE ONLY | ...... | YELLOW ONLY |
| 3 | BLUE ONLY | YELLOW ONLY | RED ONLY | ...... | YELLOW ONLY |
| 4 | RED ★ | BLUE ★ | BLUE ★★ | ...... | YELLOW ★★ |
| 5 | BLUE ★ | RED ★★ | RED ★ | ...... | RED ★★★ |
| 6 | RED ★ | BLUE ONLY | BLUE ★ | ...... | YELLOW ONLY |
| 7 | YELLOW ONLY | RED ONLY | RED ★ | ...... | YELLOW ONLY |
| 8 | BLUE ONLY | BLUE ★ | BLUE ★ | ...... | YELLOW ONLY |
| 9 | RED ONLY | RED ONLY | RED ONLY | ...... | BLUE ★★★ |
| 10 | YELLOW ★ | YELLOW ★ | YELLOW ★ | ...... | YELLOW ONLY |

FIG. 8

| PLAYER ID | MEDAL | TICKET | VIRTUAL CURRENCY | OWNED CARD INFORMATION | OWNED ITEM INFORMATION | AREA INFORMATION |
|---|---|---|---|---|---|---|
| 1 | 50 | 70 | 0 | OWNED CARD INFORMATION (1) | OWNED ITEM INFORMATION (1) | AREA INFORMATION (1) |
| 2 | 20 | 85 | 500 | OWNED CARD INFORMATION (2) | OWNED ITEM INFORMATION (2) | AREA INFORMATION (2) |
| 3 | 100 | 120 | 700 | OWNED CARD INFORMATION (3) | OWNED ITEM INFORMATION (3) | AREA INFORMATION (3) |
| 4 | 0 | 85 | 1000 | OWNED CARD INFORMATION (4) | OWNED ITEM INFORMATION (4) | AREA INFORMATION (4) |
| 5 | 10 | 30 | 100 | OWNED CARD INFORMATION (5) | OWNED ITEM INFORMATION (5) | AREA INFORMATION (5) |
| 6 | 150 | 190 | 3000 | OWNED CARD INFORMATION (6) | OWNED ITEM INFORMATION (6) | AREA INFORMATION (6) |
| . | . | . | . | . | . | . |
| . | . | . | . | . | . | . |
| . | . | . | . | . | . | . |

FIG. 9

OWNED CARD INFORMATION (3)
OWNED CARD INFORMATION (2)
OWNED CARD INFORMATION (1)

| CARD ID | LEVEL | ATTACK STRENGTH | DEFENSE STRENGTH | HIT POINT |
|---|---|---|---|---|
| 0011 | Lv.3 | 25 | 100 | 60 |
| 0211 | Lv.4 | 70 | 70 | 80 |
| 0133 | Lv.7 | 60 | 300 | 100 |
| ⋮ | ⋮ | ⋮ | ⋮ | ⋮ |

FIG. 10

OWNED ITEM INFORMATION (3)
OWNED ITEM INFORMATION (2)
OWNED ITEM INFORMATION (1)

| ITEM ID | NUMBER OWNED |
|---|---|
| 0001 | 20 |
| 0002 | 10 |
| 0003 | 1 |
| ⋮ | ⋮ |

INFORMATION PROCESSING DEVICE AND NON-TRANSITORY COMPUTER-READABLE STORAGE MEDIUM STORING GAME PROGRAM

BACKGROUND OF THE INVENTION

1. Field of the Invention

The present invention relates to an information processing device and a non-transitory computer-readable storage medium storing a game program.

2. Description of Related Art

There is known a game system for providing a lottery game that allows a player to possess different types of game points (medals, for example), and causes a game point of a type specified by the player to be consumed to select a game content to be acquired by the player by lottery (for example, JP 5280579 B1).

In this lottery game, the values of game contents acquirable by lottery are made different depending on the types of game points consumed, so that the game points have different values depending on the types thereof. Thus, players need to plan a strategy such as from which type of game points are to be consumed in order, so as to acquire a game content of a high value. However, only consuming game points from those of a type of a low value in order enables effective acquisition of a game content of a high value, which results in the lottery game lacking in strategic characteristics.

SUMMARY OF THE INVENTION

The present invention has been made in view of these circumstances, and has an object of providing a lottery game with enhanced strategic characteristics.

According to a main aspect of the present invention, there is provided an information processing device that includes a storage unit configured to store lottery information in which a drawing probability of a game content acquirable by lottery is set in association with each of a plurality of areas, and player information in which a first game point and a second game point that a player possesses are set in association with the player; and a control unit configured to perform: area selection processing in which the first game point or the second game point specified by the player is consumed to select an area from among the plurality of areas based on the amount of consumption of the first game points or the second game points, wherein the range of selectable areas differs between a case where the first game point is consumed to select an area and a case where the second game point is consumed to select an area; and lottery processing in which a game content to be acquired by the player is selected by lottery, based on the drawing probability associated with the area selected.

Other features of the present invention will be apparent from description of the specification and the accompanying drawings.

BRIEF DESCRIPTION OF THE DRAWINGS

FIG. 4 is a diagram illustrating an example of a data structure of card information;

FIG. 5 is a diagram illustrating an example of a data structure of item information;

FIG. 6 is a diagram illustrating an example of a data structure of deck information;

FIG. 7 is a diagram illustrating an example of a data structure of lottery information;

FIG. 8 is a diagram illustrating an example of a data structure of player information;

FIG. 9 is a diagram illustrating an example of a data structure of owned card information;

FIG. 10 is a diagram illustrating an example of a data structure of owned item information;

DETAILED DESCRIPTION OF THE INVENTION

Figure 1:
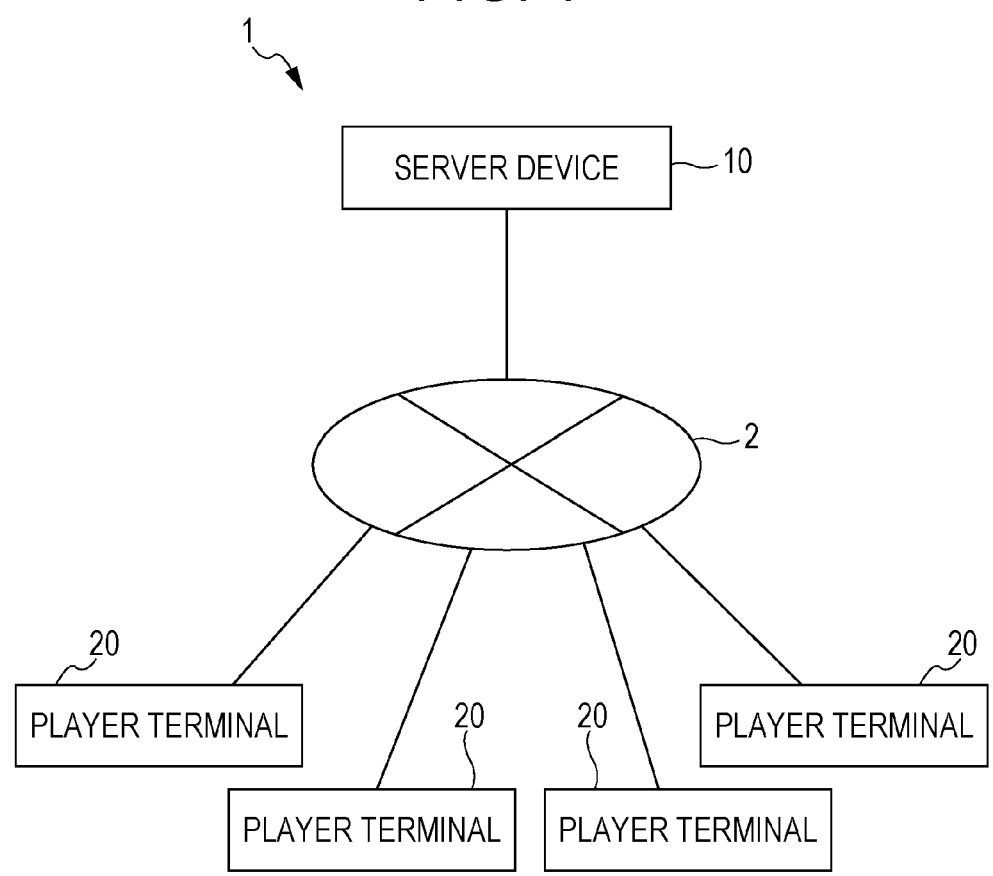
FIG. 1 is a diagram illustrating an example of an overall configuration of a game system.

Description in the specification and the accompanying drawings show at least the following matters.

That is, an information processing device includes: a storage unit configured to store lottery information in which a drawing probability of a game content acquirable by lottery is set in association with each of a plurality of areas, and player information in which a first game point and a second game point that a player possesses are set in association with the player; and a control unit configured to perform: area selection processing in which the first game point or the second game point specified by the player is consumed to select an area from among the plurality of areas based on the amount of consumption of the first game points or the second game points, wherein the range of selectable areas differs between a case where the first game point is consumed to select an area and a case where the second game point is consumed to select an area; and lottery processing in which a game content to be acquired by the player is selected by lottery, based on the drawing probability associated with the area selected.

This information processing device, in which an area selected differs, depending on how the player specifies the first game point or the second game point to be consumed, and the drawing probability changes, depending on how an area is selected, can thus provide a lottery game with enhanced strategic characteristics.

Further, in this information processing device, in the lottery processing, the control unit may cause the first game point or the second game point specified by the player to be consumed to select a quantity of game contents based on the amount of consumption of the first game points or the second game points by lottery, and make the amount of consumption that can be consumed differ between a case where the first game point is consumed to perform a lottery and a case where the second game point is consumed to perform a lottery.

This information processing device, in which the quantity of game contents acquirable changes, depending on how the player consumes the first game point and the second game point which differ in the amount of consumption that can be consumed from each other, can thus provide a lottery game with further enhanced strategic characteristics.

Moreover, in this information processing device, in the lottery processing, with selection of a special game content as the game content to be acquired by the player as a trigger, the control unit may change the drawing probability associated with the area.

This information processing device, even when a special game content has been acquired, allows a special game content to be acquired by lottery based on a changed drawing probability.

Furthermore, in this information processing device, the control unit may perform screen generation processing for generating a game screen in which information showing the degree of ease of acquiring a game content is displayed in association with each of the areas, based on the drawing probability associated with each of the areas.

This information processing device, in which information showing the degree of ease of acquiring a game content is presented to the player, can thus allow the player to plan a strategy such as how to consume the first game point or the second game point while determining a target area.

Further, in this information processing device, in the area selection processing, the control unit may select an area randomly from among the plurality of areas when the first game point is consumed to select an area, and select an area from among the plurality of areas in preset selection order when the second game point is consumed to select an area.

This information processing device, in which a method of selecting an area changes, depending on which game point of the first game point and the second game point is consumed, can thus provide a lottery game with more enhanced strategic characteristics.

Next, a non-transitory computer-readable storage medium storing a game program causes a computer to perform: processing for storing in a storage unit lottery information in which a drawing probability of a game content acquirable by lottery is set in association with each of a plurality of areas, and player information in which a first game point and a second game point that a player possesses are set in association with the player; area selection processing for causing the first game point or the second game point specified by the player to be consumed to select an area from among the plurality of areas based on the amount of consumption of the first game points or the second game points, wherein the range of selectable areas differs between a case where the first game point is consumed to select an area and a case where the second game point is consumed to select an area; and lottery processing for selecting a game content to be acquired by the player by lottery, based on the drawing probability associated with the area selected.

This game program can provide a lottery game with enhanced strategic characteristics.

Embodiment

<<About Configuration of Game System 1>>

FIG. 1 is a diagram showing an example of an overall configuration of a game system 1 according to an embodiment of the present invention. The game system 1 provides players with various types of game-related services via a network 2 (such as the Internet), and is configured to include a server device 10 and a plurality of player terminals 20.

<<About Configuration of Server Device 10>>

Figure 2:
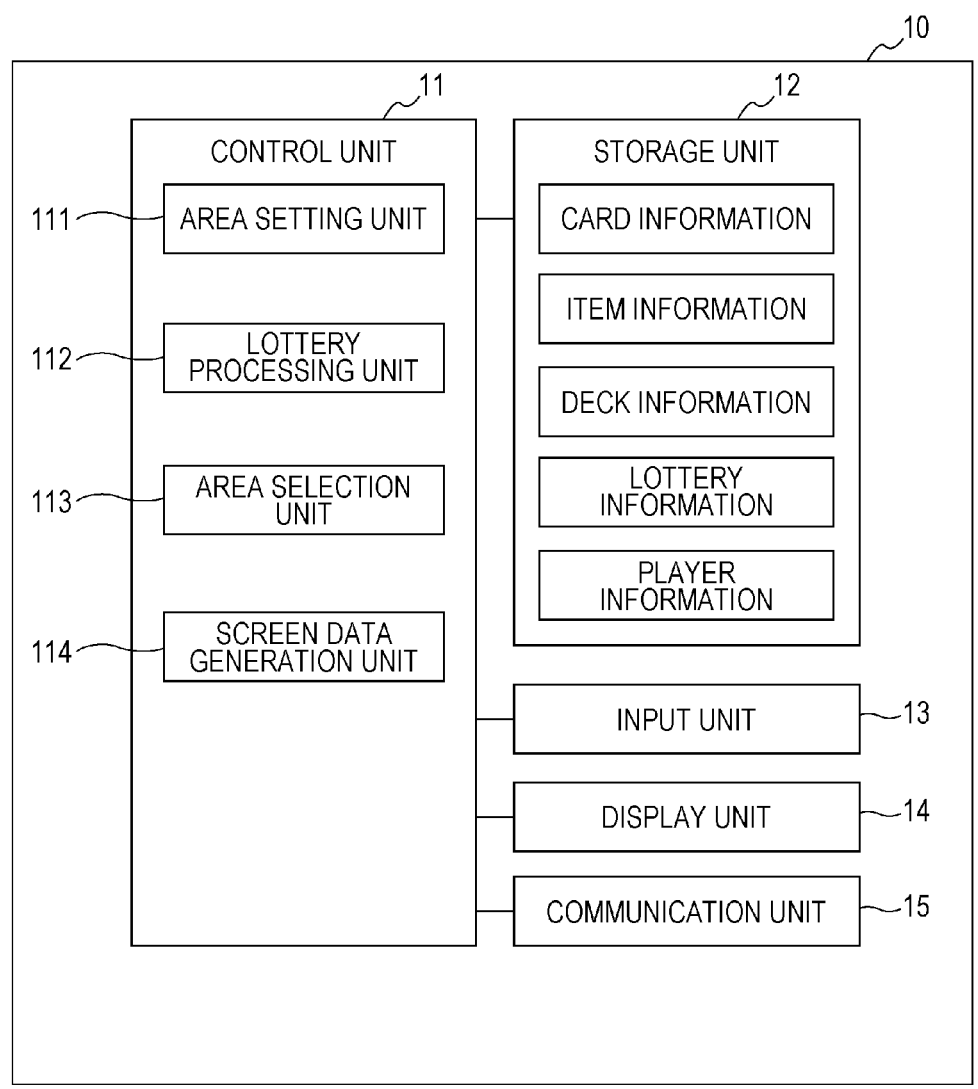
FIG. 2 is a block diagram illustrating a functional configuration of a server device.

FIG. 2 is a block diagram illustrating a functional configuration of the server device 10 according to the present embodiment. The server device 10 is an information processing device (such as a workstation or a personal computer) used by a system administrator etc. when operating and managing game services. When receiving various types of commands (requests) from the player terminals 20, the server device 10 can deliver game programs operable on the player terminals 20, and web pages (such as game screens) created in a markup language (such as HTML) suited to the standards of the player terminals 20 (response). The server device 10 includes a control unit 11, a storage unit 12, an input unit 13, a display unit 14, and a communication unit 15.

The control unit 11 controls the entire server device 10 as well as transferring data between the units, and is realized by a central processing unit (CPU) that executes a program stored in a given memory. The control unit 11 in the present embodiment includes an area setting unit 111, a lottery processing unit 112, an area selection unit 113, and a screen data generation unit 114.

The area setting unit 111 has a function of performing processing for making various settings on each of a plurality of areas. The lottery processing unit 112 has a function of performing processing for causing a game point specified by a player to be consumed to award a game content selected from among a plurality of game contents to the player. The area selection unit 113 has a function of performing processing for causing a game point specified by a player to be consumed to select an area from among a plurality of areas. The screen data generation unit 114 has a function of performing processing for generating screen data for game screens to be displayed on the player terminals 20. The screen data generation unit 114 in the present embodiment generates HTML data as screen data corresponding to game screens.

The storage unit 12 includes a read-only memory (ROM) that is a read-only storage area in which a system program is stored, and a random access memory (RAM) that is a rewritable storage area used as a work area for computation by the control unit 11, and is realized by a non-volatile storage device such as a flash memory or a hard disk. The storage unit 12 in the present embodiment stores at least card information as information on game cards, item information as information on game items, deck information as information on decks, lottery information as information on a lottery, and player information as information on players. These pieces of information will be described in detail later.

The input unit 13 is for entering various types of data (such as character information) by a system administrator etc., and is realized by a keyboard and a mouse, for example.

The display unit 14 is for displaying an operation screen for a system administrator based on a command from the control unit 11, and is realized by a liquid crystal display (LCD), for example.

The communication unit 15 is for performing communication with the player terminals 20, and has a function as a receiving unit for receiving various types of data and signals transmitted from the player terminals 20, and a function as a transmitting unit for transmitting various types of data and signals to the player terminals 20 in accordance with a command from the control unit 11. The communication unit 15 is realized by a network interface card (NIC), for example.

<<About Configuration of Player Terminal 20>>

Figure 3:
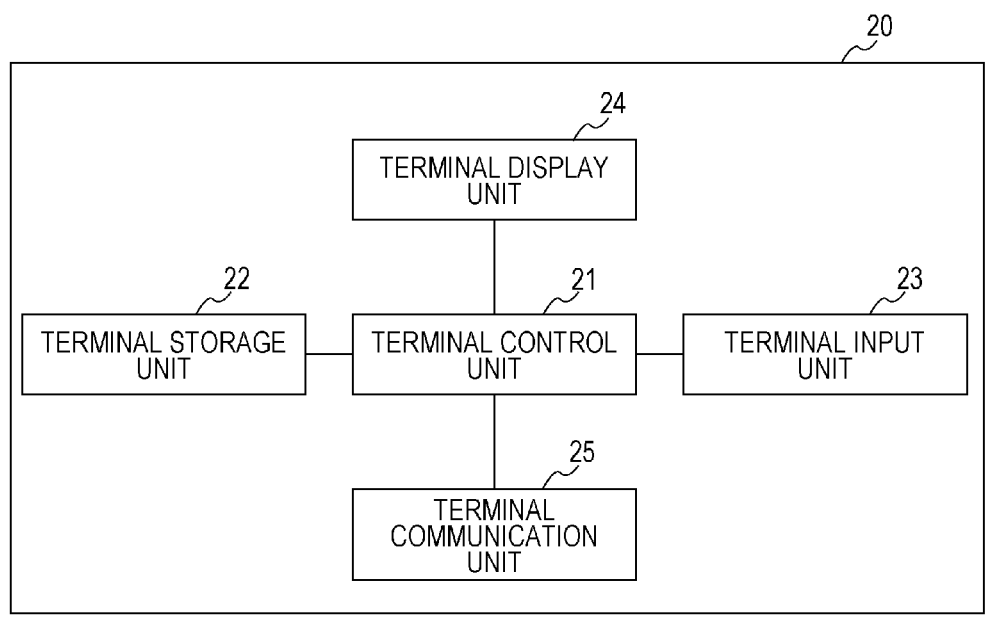
FIG. 3 is a block diagram illustrating a functional configuration of a player terminal.

FIG. 3 is a block diagram illustrating a functional configuration of each player terminal 20. The player terminal 20 in the present embodiment is an information processing device (such as a cellular phone terminal, a smartphone, or a tablet terminal) used by a player when playing a game, and is capable of making a request to the server device 10 for the delivery of various types of game-related information (such as a game program and a web page). The player terminal 20 has a web browser function to allow the player to view web pages, and thus can display a web page (such as a game screen) delivered from the server device 10. The player terminal 20 includes a terminal control unit 21, a terminal storage unit 22, a terminal input unit 23, a terminal display unit 24, and a terminal communication unit 25.

The terminal control unit 21 controls the entire player terminal 20 as well as transferring data between the units, and is realized by a central processing unit (CPU) that executes a program stored in a given memory. The terminal control unit 21 in the present embodiment also functions as a screen display control unit for controlling the display mode of a game screen displayed on the terminal display unit 24. The terminal storage unit 22 is connected to the terminal control unit 21 via a bus so that processing for referring to, reading, and rewriting stored data is performed in accordance with commands from the terminal control unit 21. The terminal storage unit 22 is realized by a flash memory or a hard disk, for example. The terminal input unit 23 is for the player to perform various operations (such as game operations), and is realized by operation buttons or a touch panel, for example. The terminal display unit 24 is for displaying a game screen by a command from the terminal control unit 21, and is realized by a liquid crystal display (LCD), for example. The terminal communication unit 25 functions as a transmitting and receiving unit for transmitting and receiving various types of information to and from the server device 10 via the network 2, and is realized by a network interface card (NIC), for example.

<<About Data Structure>>

FIG. 4 is a diagram illustrating an example of a data structure of card information stored in the storage unit 12 of the server device 10. The card information includes items (fields) such as card ID, character name, character image, rarity, initial attack strength, initial defense strength, and initial hit point. The Card ID is identification information identifying game cards as an example of game contents. The character name is information showing names that indicate characters associated with the game cards. The character image is image data on the characters. The rarity is a parameter indicating the degree of rarity of each game card. In the present embodiment, four levels of rarity ("common"→"uncommon"→"rare"→"super rare") are set for the game cards (characters). The initial attack strength, the initial defense strength, and the initial hit point of the characters are parameters indicating the capability values initially set for the characters.

FIG. 5 is a diagram illustrating an example of a data structure of item information stored in the storage unit 12 of the server device 10. The item information includes items such as item ID and item name. The item ID is identification information identifying items. The item name is information showing names that indicate the items.

FIG. 6 is a diagram illustrating an example of a data structure of deck information stored in the storage unit 12 of the server device 10. The deck information is information defining card holding decks (also referred to simply as "decks") in each of which predetermined numbers of different game cards that can be acquired by a player are collected in a set. The deck information has items such as deck ID, design, main card, and sub card. The deck ID is identification information identifying the decks. The design is image data for performing identification display for areas with which decks are associated in accordance with the types of the decks. In the deck information in the present embodiment, a total of twelve designs are set by combining displays in three colors using blue, red, and yellow, and mark displays in four patterns using no star, one star, two stars, and three stars. That is, in each area, a design corresponding to the type of an associated deck is displayed. The main card is an example of a special game content, and is information showing game cards for which the highest level of rarity is set among the game cards held in the decks. The sub card is information showing game cards for which a level of rarity lower than that of the main cards is set among the game cards held in the decks. For each of the main cards and the sub cards, the number held is set in association therewith.

In the present embodiment, for example, a deck with deck ID "1" is a deck associated with an area color-displayed in "blue only" (with no star), and is a deck holding one main card A, nine sub cards A, ten sub cards B, ten sub cards C, and ten sub cards D. Therefore, the drawing probability (winning probability) of the main card A is $1/40$, the drawing probability of the sub cards A is $9/40$, the drawing probability of the sub cards B is $10/40$, the drawing probability of the sub cards C is $10/40$, and the drawing probability of the sub cards D is $10/40$.

A deck with deck ID "2" is a deck associated with an area color-displayed in "blue" and marked with "one star," and is a deck holding one main card A, nine sub cards A, ten sub cards B, and ten sub cards C. Therefore, the drawing probability of the main card A is $1/30$, the drawing probability of the sub cards A is $9/30$, the drawing probability of the sub cards B is $10/30$, and the drawing probability of the sub cards C is $10/30$. That is, when there is a "one star" mark, sub cards D are excluded from objects to be drawn, resulting in increased drawing probabilities of the game cards as compared with a case with "no star."

A deck with deck ID "3" is a deck associated with an area color-displayed in "blue" and marked with "two stars," and is a deck holding one main card A, nine sub cards A, and ten sub cards B. Therefore, the drawing probability of the main card A is $1/20$, the drawing probability of the sub cards A is $9/20$, and the drawing probability of the sub cards B is $10/20$. That is, when there is a "two star" mark, sub cards C and sub cards D are excluded from objects to be drawn, resulting in increased drawing probabilities of the game cards as compared with a case with "one star."

A deck with deck ID "4" is a deck associated with an area color-displayed in "blue" and marked with "three stars," and is a deck holding one main card A and nine sub cards A. Therefore, the drawing probability of the main card A is $1/10$, and the drawing probability of the sub cards A is $9/10$. That is, when there is a "three star" mark, sub cards B, sub cards C, and sub cards D are excluded from objects to be drawn, resulting in increased drawing probabilities of the game cards as compared with a case with "two stars."

Thus, the deck information in the present embodiment determines the drawing probabilities of the game cards by the compositions of the game cards held in the decks. Further, the deck information is set so that as the number of stars increases, the holding number of sub cards excluded from objects to be selected is increased, and thus as the number of starts increases, the drawing probabilities of the game contents increase.

A deck with deck ID "9" is a deck associated with an area color-displayed in "yellow only," and is a deck holding one main card A, one main card B, nine sub cards A, ten sub cards B, ten sub cards C, and ten sub cards D. Therefore, the drawing probability of the main card A is $1/41$, the drawing probability of the main card B is $1/41$, the drawing probability of the sub cards A is $9/41$, the drawing probability of the sub cards B is $10/41$, the drawing probability of the sub cards C is $10/41$, and the drawing probability of the sub cards D is $10/41$. That is, two types of main cards (the main card A and the main card B) are held, so that the winning probability of the main cards (the main card A and the main card B) is increased as compared with the deck with deck ID "1" (the deck associated with an area color-displayed in "blue only").

Thus, the deck information in the present embodiment is set so that the holding number of main cards to be selected is increased for the deck associated with an area color-displayed in "yellow only" to increase the drawing probability of the main cards.

Decks associated with areas color-displayed in "red" (decks with deck IDs "5" to "8") have the same drawing probabilities of main cards and sub cards as those of the decks associated with areas color-displayed in "blue" (decks with deck IDs "1" to "4"), but are different in the types of main cards.

FIG. 7 is a diagram illustrating an example of a data structure of lottery information stored in the storage unit 12 of the server device 10. The lottery information is information in which drawing probabilities of game contents acquirable by lottery are set in association with each of a plurality of areas. In the present embodiment, in association with each of the plurality of areas, one of the twelve types of decks (see FIG. 6) is set for each level of the area. In the lottery information, the decks are set so that as the levels of the areas increase, the drawing probabilities increase. Specifically, for the areas, decks are set so that areas marked with a star(s) and areas color-displayed in "yellow" increase as the level increases.

FIG. 8 is a diagram illustrating an example of a data structure of player information stored in the storage unit 12 of the server device 10. The player information includes items such as player ID, medal, ticket, virtual currency, owned card information, owned item information, and area information. The player ID is identification information identifying players. The medal is an example of a first game point, and is information showing the amounts of medals that the players possess. The ticket is an example of a second game point, and is information showing the amounts of thickets that the players possess. The virtual currency is information showing the amounts of virtual currency that the players possess. The players can exchange virtual currency they have purchased previously for tickets. The owned card information is information showing game cards owned by the players. The owned item information is information showing items owned by the players. The area information is information defining areas included in game fields of the players.

FIG. 9 is a diagram illustrating an example of a data structure of the owned card information. The owned card information has items such as card ID, level, attack strength, defense strength, and hit point. The card ID is identification information identifying game cards (characters) owned by a player. The level, attack strength, defense strength, and hit point are parameters indicating the current capability values set for game cards (characters) owned by a player. These types of parameters are updated according to the progress of a game.

FIG. 10 is a diagram illustrating an example of a data structure of the owned item information. The owned item information includes items such as item ID and number owned. The item ID is identification information identifying items owned by a player. The number owned is information showing the number of items owned by a player.

Figure 11:
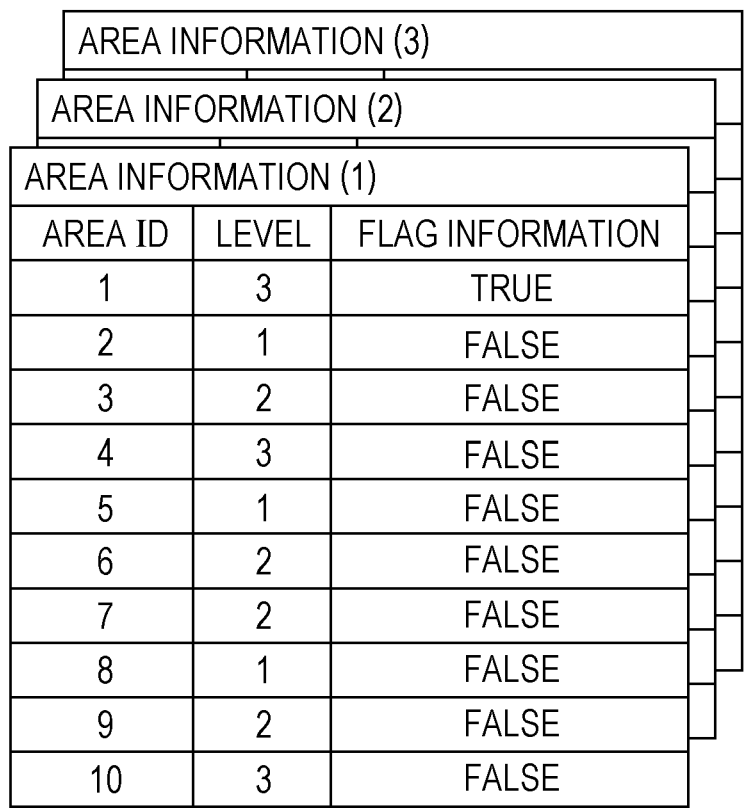
FIG. 11 is a diagram illustrating an example of a data structure of area information.

FIG. 11 is a diagram illustrating an example of a data structure of the area information. The area information includes items such as area ID, level, and flag information. The area ID is identification information identifying areas in a game field. The level is information showing current levels set for the areas. In the present embodiment, for example, level "3" is associated with an area with area ID "1," which is thus color-displayed in yellow (see FIG. 7), and for which a deck with deck ID "9" is set (see FIG. 6). The level increases each time a main card is drawn in a deck associated with an area, and the data is updated. The flag information is information showing a current area selected by the area selection unit 113. In the present embodiment, "TRUE" is set for an area selected (hereinafter, also referred to as a "current area"), and "FALSE" is set for the other areas.

<<About Outline of Game>>

Here, the outline of a game provided by the game system 1 in the present embodiment will be given. The game system 1 provides a lottery game played using electronic game cards (hereinafter, also referred to as "characters") with which game characters are associated.

<Lottery Game>

In the game system 1 of the present embodiment, a player causes a medal or a ticket in his or her possession to be consumed, thereby being able to play a lottery game, the so-called "GACHAGACHA" (a registered trademark).

In this lottery game, a quantity of game cards corresponding to the amount of consumption of medals or tickets are selected from among a plurality of game cards held in a deck by lottery, and are awarded to the player. In the present embodiment, the amount of consumption of medals is limited to only one, and the amount of consumption of tickets is limited to ten.

Additionally, a player can play a fighting game using a game card (character) acquired in the lottery game.

A deck includes a main card(s) of the highest class of rarity among a plurality of game cards held in the deck, and sub cards of a class of rarity lower than that of the main card(s).

The drawing probabilities of game cards held in a deck are determined by the total holding number of the game cards held in the deck. For example, when one main card and thirty-nine sub cards are held in a deck, the total holding number is forty, and thus the main card drawing probability is $1/40$, and the sub card drawing probability is $39/40$.

In the lottery game in the present embodiment, a plurality of types of decks is prepared in advance, and each time the lottery game is performed, a deck is selected from among the plurality of types of decks. The deck selection is performed by selecting an area from among a plurality of areas.

In the present embodiment, a plurality of areas (unit areas) is included in a game field, and a deck is set in association with each of the areas. When a player causes one of a medal and a ticket to be consumed, an area is selected from among the plurality of areas based on the amount of consumption thereof. The selection of an area in this manner causes a deck associated with the selected area to be selected as a deck used in the lottery.

In the selection of an area, when a medal is consumed, an area is randomly selected from among the plurality of areas, and when a ticket is consumed, an area is selected from among the plurality of areas in preset selection order. The amount of consumption of medals is limited to only one, and the amount of consumption of tickets is limited to ten.

Thus, according to the game system 1 in the present embodiment, an area selected changes, depending on how the player selects a medal or a ticket and how the player specifies the amount of consumption thereof, and the drawing probabilities of the game cards change, depending on which area among the plurality of areas is selected. Thus, a lottery game with enhanced strategic characteristics can be provided.

<<About Operation of Game System 1>>

Figure 12:
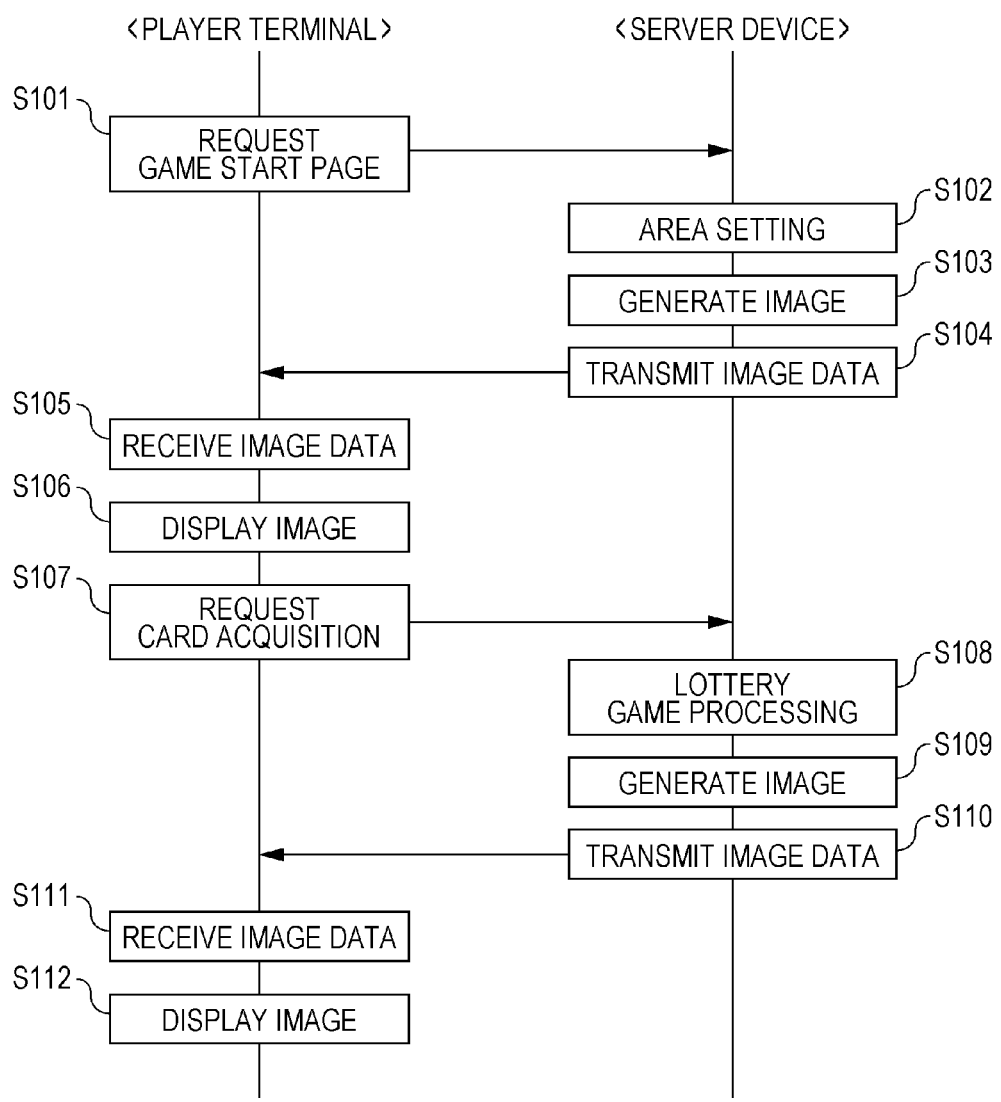
FIG. 12 is a flowchart for illustrating an example of operation of the game system.

FIG. 12 is a flowchart for illustrating an example of operation of the game system 1 according to the present embodiment.

First, at the player terminal 20, the terminal control unit 21, when receiving a player's operation input from the terminal input unit 23, transmits a command to acquire a game start page (game screen) of the lottery game (game start page request) to the server device 10 via the terminal communication unit 25 (S101).

Next, receiving the game start page request transmitted from the player terminal 20, the server device 10 performs various settings on each area arranged in a game field of the player (S102). Specifically, based on the player information (see FIG. 8) and the area information (see FIG. 11) stored in the storage unit 12, the area setting unit 111 acquires levels associated with the areas, individually, and based on the deck information (see FIG. 6) and the lottery information (see FIG. 7) stored in the storage unit 12, sets decks according to the levels of the areas. The area setting unit 111 also performs setting on a current area of the player, based on the area information (see FIG. 11).

Next, when the area settings have been performed in this manner, the server device 10 causes the screen data generation unit 114 to generate screen data (HTML data) for the display of the game start page on the player terminal 20 (S103). The screen data generation unit 114 generates screen data corresponding to the game start page, based on the above-described area settings.

The server device 10 then transmits the screen data (HTML data) corresponding to the game start page generated in this manner to the player terminal 20 as the originator of the request via the network 2 (S104).

Next, receiving the screen data (HTML data) transmitted from the server device 10 (S105), the player terminal 20 analyzes the screen data to cause the terminal display unit 24 to display the game start page (game screen) (S106).

Figure 13:
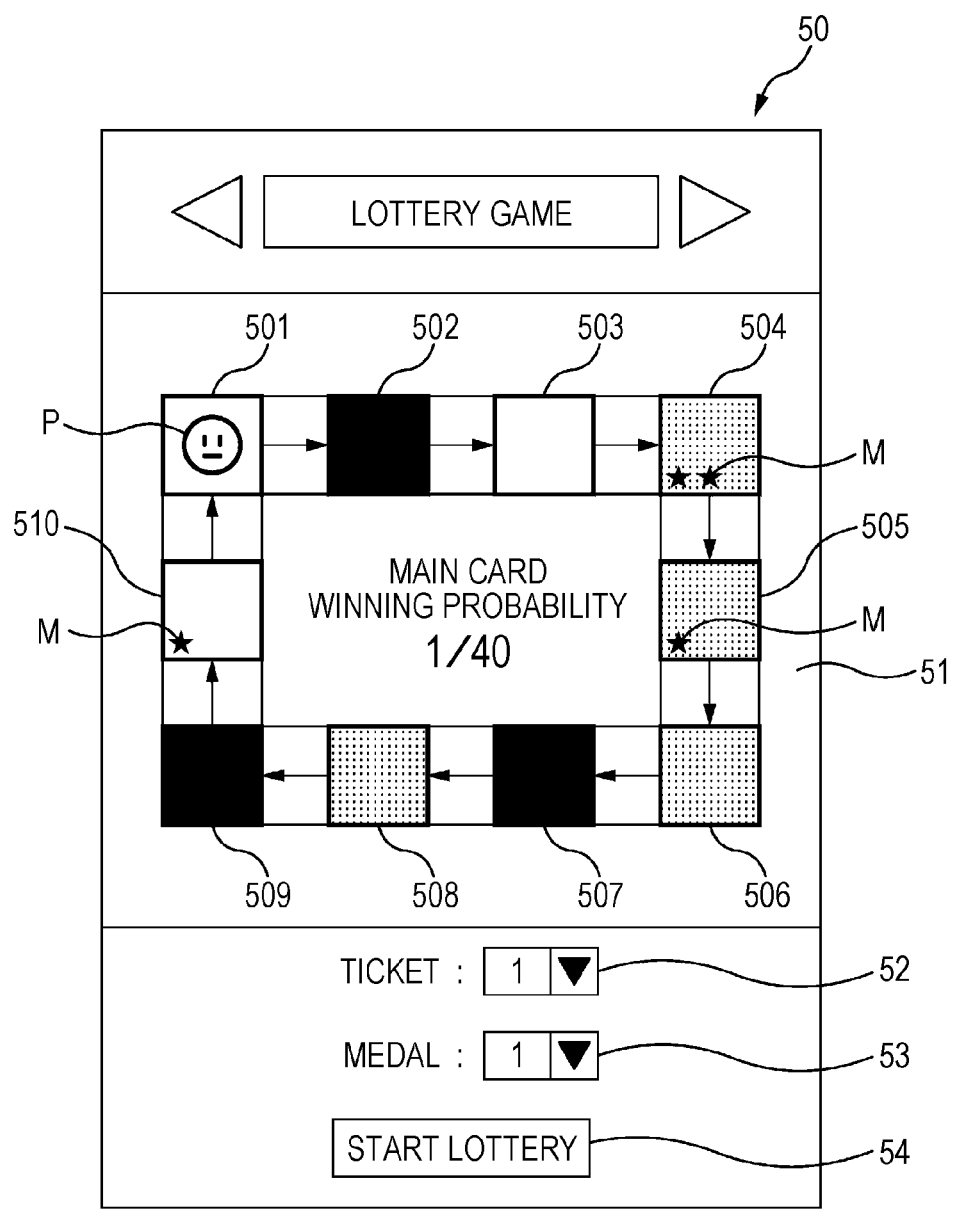
FIG. 13 is a diagram illustrating an example of a game screen.

FIG. 13 is a diagram illustrating an example of a game screen 50 displayed on the terminal display unit 24. The game screen 50 includes a game field 51, a pull-down menu 52, a pull-down menu 53, an operation button 54, and a first area 501 to a tenth area 510. The game field 51 includes a plurality of areas (the first area 501 to the tenth area 510). The first area 501 to the tenth area 510, with each of which a deck set based on the deck information (see FIG. 6) and the lottery information (see FIG. 7) is associated, are displayed in colors of red, blue, and yellow, some of which are marked with one to three stars, with an indication of a current area. Here, the fourth area 504 is marked with two stars M, and the fifth area 505 and the tenth area 510 are marked with one star M. In the first area 501, a character P indicating a current area is displayed. The pull-down menu 52 is an operation area for the player to specify the number of tickets to be consumed. The pull-down menu 53 is an operation area for the player to specify the number of medals to be consumed. The operation button 54 is an operation area for the player to start the lottery game.

Next, returning to FIG. 12, when the game screen 50 shown in FIG. 13 is displayed on the terminal display unit 24, the pull-down menu 52 or the pull-down menu 53 is operated by the player to select the number of medals or the number of tickets to be consumed, and then the operation button 54 is selected by the player. Based on this operation information, the terminal control unit 21 in the player terminal 20 transmits a command to request card acquisition (card acquisition request) to the server device 10 via the terminal communication unit 25 (S107).

Next, receiving the card acquisition request transmitted from the player terminal 20, the server device 10 performs lottery game processing in which a game card to be acquired by the player is selected by lottery (S108).

Hereinafter, a case where a medal is consumed to perform the lottery game processing and a case where a ticket is consumed to perform the lottery game processing will be described in detail, individually.

Figure 14:
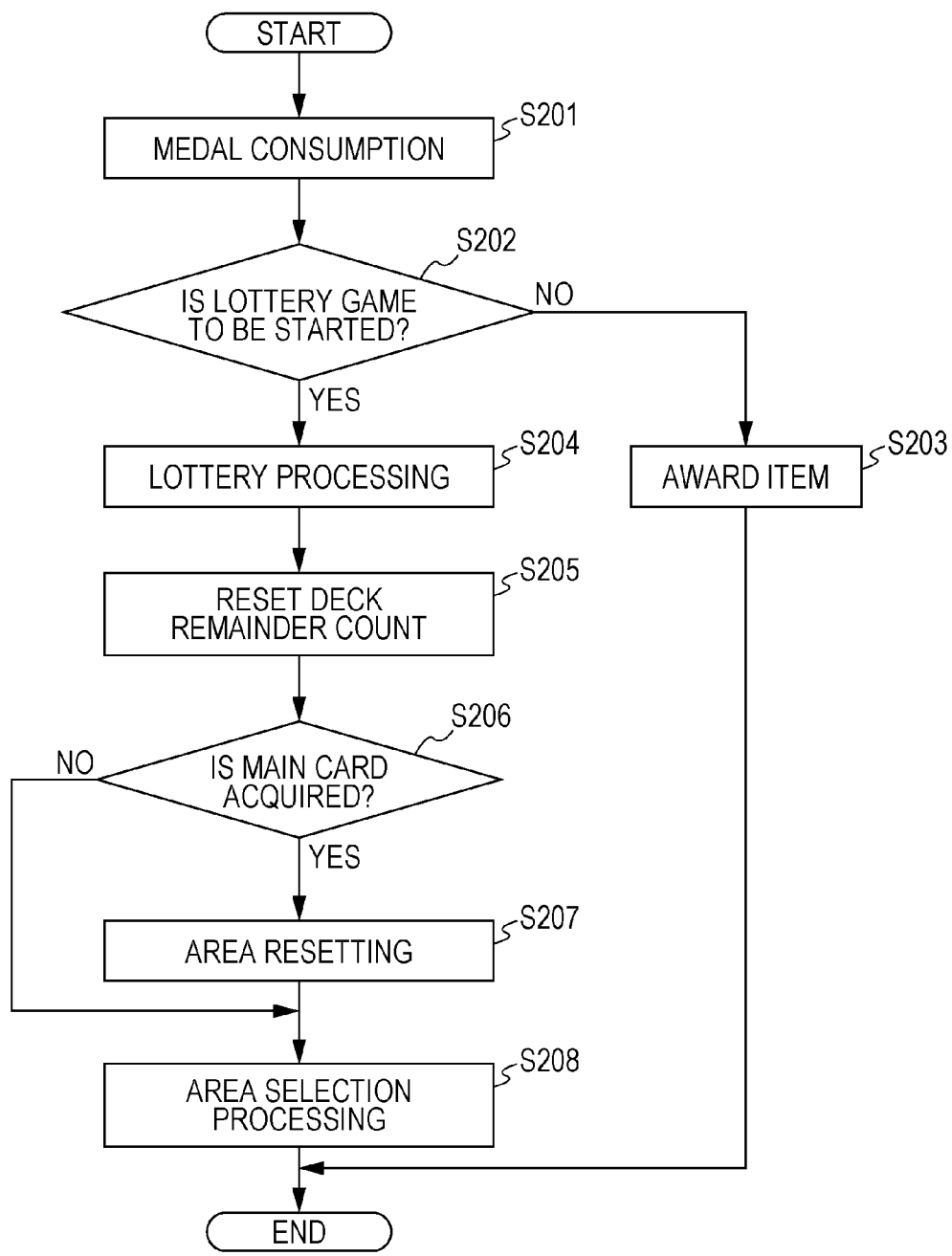
FIG. 14 is a flowchart for illustrating lottery game processing when a medal is consumed.

FIG. 14 is a flowchart for illustrating the lottery game processing when a medal is consumed.

First, the lottery processing unit 112 causes a number of medals specified by the player to be consumed, and updates the number of medals in the player information shown in FIG. 8 (S201). At this time, the lottery processing unit 112 limits the number of medals that can be consumed to a number lower than the number of tickets that can be consumed, so as to set the value of tickets higher than the value of medals. In the present embodiment, the number of medals consumed is limited to only one, and the number of tickets consumed is limited to ten.

Next, the lottery processing unit 112 performs a lottery with a probability of ½ to determine whether to continue to start the lottery game or not (S202). Thus in the present embodiment, when the player causes a medal among medals and tickets to be consumed to play the lottery game, he or she cannot always acquire a game card.

When determining that the lottery game will not be started as a result of the lottery (S202: NO), the lottery processing unit 112 awards the player an item selected from among a plurality of items based on the item information shown in FIG. 5, and updates the owned item information (see FIG. 10) on the player (S203).

On the other hand, when it is determined that the lottery game will be continued to be started (S202: YES), the lottery processing is performed (S204). Specifically, the lottery processing unit 112 specifies a current area based on the area information (see FIG. 11) on the player, and specifies a deck set for the current area based on the deck information (see FIG. 6) and the lottery information (see FIG. 7). Based on the drawing probabilities of the deck specified, the lottery processing unit 112 then selects a quantity of game cards based on the number of medals consumed from among a plurality of game cards (a main card(s) and sub cards) held in the deck, to select a game card to be acquired by the player, and updates the owned card information (see FIG. 9) on the player.

Next, the number of remaining game cards held in the deck that is set for the current area is reset (S205). That is, although the acquisition of the game card by the player results in a reduced number of game cards in the current deck, the lottery processing unit 112 restores the total holding number of game cards held in the current deck to the initial value, and updates the lottery information (see FIG. 7).

Next, the lottery processing unit 112 determines whether, as a result of the lottery, a main card among the main card(s) and the sub cards has been selected as a game card to be acquired by the player or not (S206).

As a result of the determination, when a sub card among the main card(s) and the sub cards has been selected as a game card to be acquired by the player (S206: NO), the process proceeds to step 208.

On the other hand, when a main card among the main card(s) and the sub cards has been selected as a game card to be acquired by the player (S206: YES), reset of the area is performed (S207). Specifically, the area setting unit 111 increases the level of the current area by one based on the area information (see FIG. 11) on the player, thereby setting a new deck for the current area. That is, with the selection of a main card as a game card to be acquired by the player as a trigger, the drawing probabilities associated with the current area are changed. In the present embodiment, in the lottery information shown in FIG. 7, decks are set so that as the levels of the areas increase, the drawing probabilities increase, and thus the setting of a new deck for the current area facilitates the acquisition of a main card.

Subsequently, the area selection processing is performed (S208). Specifically, the area selection unit 113 selects an area from among the first area 501 to the tenth area 510 shown in FIG. 13, based on the number of medals consumed in step 201. The area selection unit 113 in the present embodiment selects an area in clock-wise advancing order with reference to the first area 501 as the current area. When an area is selected by the consumption of a medal, an area located forward of the current area by one to three in the advancing direction is randomly selected. That is, one of the second area 502, the third area 503, and the fourth area 504 is selected. When one of the areas is selected by the area selection unit 113 in this manner, the area is set as the next new current area, and the flag information in the area information shown in FIG. 11 is updated.

The next new current area selected like this will be used when a game card to be acquired by the player is selected in the next lottery. Therefore, when the player causes a medal to be consumed to play the lottery game, the next new current area is randomly determined, and thus it is difficult to intentionally aim at an area for which a deck with high drawing probabilities are set (for example, the fourth area 504 marked with two stars M).

Figure 15:
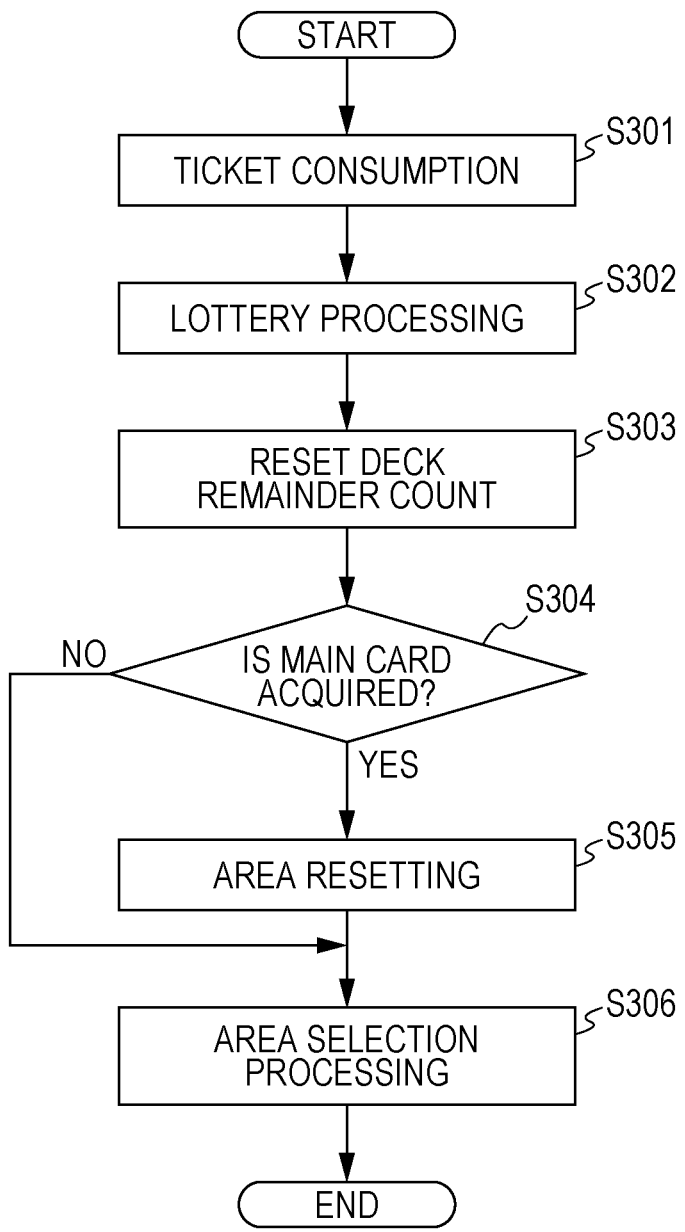
FIG. 15 is a flowchart for illustrating lottery game processing when a ticket is consumed.

FIG. 15 is a flowchart for illustrating the lottery game processing when a ticket is consumed.

First, the lottery processing unit 112 causes a number of tickets specified by a player to be consumed, and updates the number of tickets in the player information shown in FIG. 8 (S301). In the present embodiment, the number of tickets consumed is limited to ten.

Next, the lottery processing is performed (S302). Specifically, the lottery processing unit 112 specifies a current area based on the area information (see FIG. 11) on the player, and specifies a deck set for the current area based on the deck information (see FIG. 6) and the lottery information (see FIG. 7). Based on the drawing probabilities of the deck specified, the lottery processing unit 112 then selects a quantity of game cards based on the number of tickets consumed from among a plurality of game cards (a main card(s) and sub cards) held in the deck to select a game card to be acquired by the player, and updates the owned card information (see FIG. 9) on the player.

Next, the number of remaining game cards held in the deck that is set for the current area is reset (S303). That is, although the acquisition of the game card by the player results in a reduced number of game cards in the current deck, the lottery processing unit 112 restores the total holding number of game cards held in the current deck to the initial value, and updates the lottery information (see FIG. 7).

Next, the lottery processing unit 112 determines whether, as a result of the lottery, a main card among the main card(s) and the sub cards has been selected as a game card to be acquired by the player or not (S304).

As a result of the determination, when a sub card among the main card(s) and the sub cards has been selected as a game card to be acquired by the player (S304: NO), the process proceeds to step 306.

On the other hand, when a main card among the main card(s) and the sub cards has been selected as a game card to be acquired by the player (S304: YES), reset of the area is performed (S305). Specifically, the area setting unit 111 increases the level of the current area by one based on the area information (see FIG. 11) on the player, thereby setting a new deck for the current area. That is, with the selection of a main card as a game card to be acquired by the player as a trigger, the drawing probabilities associated with the current area are changed. In the present embodiment, in the lottery information shown in FIG. 7, decks are set so that as the levels of the areas increase, the drawing probabilities increase, and thus setting of a new deck for the current area facilitates the acquisition of a main card.

Subsequently, the area selection processing is performed (S306). Specifically, the area selection unit 113 selects an area from among the first area 501 to the tenth area 510 shown in FIG. 13, based on the number of tickets consumed in step 301. The area selection unit 113 in the present embodiment selects an area in clock-wise advancing order with reference to the first area 501 as the current area. When an area is selected by the consumption of a ticket, an area located forward in the advancing direction of the current area by a number corresponding to the amount of consumption of the tickets is selected. For example, when three tickets are consumed, with reference to the first area 501 as the current area, the fourth area 504 located forward thereof by three areas is selected. When an area is selected by the area selection unit 113 in this manner, the area is set as the next new current area, and the flag information in the area information shown in FIG. 11 is updated.

The next new current area selected in this manner will be used when a game card to be acquired by the player is selected in the next lottery. Therefore, when the player causes a ticket to be consumed to play the lottery game, an area located forward in the advancing direction by a number corresponding to the number of tickets consumed is selected, so that the player can easily aim at an area for which a deck with high drawing probabilities are set (for example, the fourth area 504 marked with two stars M).

Next, returning to FIG. 12, when a game card to be acquired by the player is selected by performing this lottery game processing, the server device 10 causes the screen data generation unit 114 to generate screen data (HTML data) showing the result of the lottery game (S109). The server device 10 then transmits the screen data generated by the screen data generation unit 114 to the player terminal 20 as the originator of the request via the network 2 (S110).

Next, receiving the screen data transmitted from the server device 10 (S111), the player terminal 20 analyzes the screen data, thereby causing the terminal display unit 24 to display a game screen (web page) showing the result of the lottery game (S112). The player can check the game card(s) awarded by the lottery game by looking at the game screen displayed on the terminal display unit 24.

As described above, according to the game system 1 of the present embodiment, an area selected changes, depending on how a player selects a medal or a ticket, and how the player specifies the amount of consumption thereof, and also drawing probabilities of game cards change, depending on which area among a plurality of areas is selected. This allows a player to enjoy the lottery game, planning a strategy such as in which order to cause medals and tickets to be consumed.

Other Embodiments

The above-described embodiment is intended to facilitate the understanding of the present invention, and is not meant to limit the present invention for interpretation. The present invention can be altered and modified without departing from the spirit thereof, and includes the equivalents thereof. In particular, embodiments described below are also included in the present invention.

<Lottery Game Processing>

In the above-described embodiment, a case where, in the lottery game processing, the area selection processing is performed after the lottery processing is performed has been described as an example. Alternatively, the lottery processing may be performed after the area selection processing is performed. Specifically, after an area is selected by the consumption of a medal or a ticket in the area selection processing, the lottery processing may be performed using a deck set for the area selected (set as a current area) to select a game card to be acquired by the player.

In the above-described embodiment, the fact that, in the lottery game processing when a medal is consumed, the lottery processing unit 112 performs a lottery with a probability of ½ to determine whether to continue to start the lottery game or not (step 202 in FIG. 14) has been described as an example. This step may be omitted. That is, the lottery game may be always started to select a game card to be acquired by a player by lottery.

In the above-described embodiment, a case where, in the lottery game processing, the lottery processing is performed using a deck set for a current area to select a game card to be acquired by a player, and then the number of remaining game cards held in the deck that is set for the current area is reset (step 205 in FIG. 14, step 303 in FIG. 15) has been described as an example, to which the present invention is not limited. For example, the number of remaining game cards held in a deck that is set for a current area may be reduced. With this, when, after the first area 501 has been set as a current area, a current area makes a circuit of the areas by the consumption of medals and/or tickets and returns to the first area 501, and the first area 501 is again set as a current area, the number of remaining game cards held in the deck that is set for the current area is reduced, and thus the winning probabilities of the game cards can be increased.

<Area Resetting>

In the above-described embodiment, a case where, when a main card is selected as a game card to be acquired by a player as a result of a lottery using a deck set for a current area, a new deck is set for the current area to reset the area has been described as an example, to which the present invention is not limited. For example, new decks may be set for all areas instead of only the current area. Specifically, when a main card is selected as a game card to be acquired by a player as a result of the lottery processing performed by the lottery processing unit 112 using a deck set for a current area, the area setting unit 111 increases the levels of all areas instead of only the current area by one, based on the area information (see FIG. 11) on the player, thereby setting new decks for all the areas, individually. At this time, the area setting unit 111 may set the first area 501 among the first area 501 to the tenth area 510 as a new current area again.

In the above-described embodiment, a case where a level is set for each of areas included in a game field, and as the level increases, a new deck is individually set for a single area has been described as an example, to which the present invention is not limited. For example, a level may be set for a game field (a level may be set for a lottery game itself, or a level may be set for a player) to set new decks for all areas as the level increases. Specifically, when a main card is selected as a game card to be acquired by a player as a result of the lottery processing performed by the lottery processing unit 112 using a deck set for a current area, the area setting unit 111 increases the level of the game field by one, thereby setting new decks for all areas. This reset of all the areas is performed based on the lottery information shown in FIG. 7.

That is, each time the level increases, the area setting unit 111 changes a group of decks to those at the next level, according to the lottery information shown in FIG. 7. Each time all areas are reset in this manner, the area setting unit 111 may initialize the setting so that the first area 501 among the first area 501 to the tenth area 510 becomes a current area.

<Consumption of Medal/Ticket>

In the above-described embodiment, a case where a player, when playing a lottery game, causes either a medal or a ticket to be consumed to play the game has been described as an example, to which the present invention is not limited. A medal and a ticket may be consumed in combination.

<Game Field>

In the above-described embodiment, a configuration in which a plurality of areas (the first area 501 to the tenth area 510) is arranged in a circle in a game field so that a current area selected can be circulated therethrough has been described as an example, to which the present invention is not limited. For example, a plurality of areas in a game field may be arranged in a line, forming a straight line or a curved line. In this case, an area as a start and an area as a goal may be set so that when reaching the goal, a current area selected is returned to the start again.

In the above-described embodiment, as shown in FIG. 13, only information on a main card in a deck associated with a current area is displayed on the game screen 50 (at a central location in the game field: "MAIN CARD WINNING PROBABILITY ¼₀"), to which the present invention is not limited. For example, information on game cards in a deck associated with a current area may be displayed on the game screen 50. Specifically, information such as a total number of all game cards held in a deck, numbers of different types of game cards currently held, wining probabilities of different types of game cards, and character names or character images of game cards may be displayed on the game screen 50.

Information on a main card in a deck and information on game cards in a deck are not limited to that on a deck associated with a current area. For example, such information on a deck associated with an area that is specified by a player may be displayed. Specifically, in response to a player's tapping with a finger one of the areas 501 to 510 displayed on the game screen 50 shown in FIG. 13, information on a main card or information on game cards in a deck associated with the area touched by the finger may be displayed on the game screen 50.

<Server Device>

In the above-described embodiment, the game system 1 including the single server device 10 as an example of a server device has been described as an example, which is not limiting. The game system 1 may include a plurality of server devices 10 as an example of a server device. That is, the plurality of server devices 10 may be connected via the network 2, and the server devices 10 perform various types of processing in a distributed manner. The server devices 10 are an example of a computer.

<Information Processing Device>

The game system 1 in the above-described embodiment has been described with an example in which the server device 10 and the player terminals 20 cooperate to perform various types of information processing based on the game program, but is not limited to this. The player terminals 20 or the server device 10 as an information processing device may perform the above-described various types of information processing based on the game program on a stand-alone basis.

Alternatively, the player terminals 20 may be configured to serve part of the functions as an information processing device. In this case, the server device 10 and the player terminals 20 constitute an information processing device.

The information processing device is an example of a computer.

<Game Program>

The game system 1 in the above-described embodiment has been described with an example in which the server device 10 and the player terminals 20 cooperate to perform the various types of information processing. The present invention also includes a game program for performing these types of processing. That is, the server device 10 and the player terminals 20 as an information processing device may perform the above-described various types of processing based on the game program.

What is claimed is:

1. An information processing device comprising:
   a storage unit configured to store lottery information in which a drawing probability of a game content acquirable by lottery is set in association with each of a plurality of areas, and player information in which a first game point and a second game point that a player possesses are set in association with the player; and
   a control unit configured to perform:
      area selection processing in which the first game point or the second game point as specified by the player is consumed to select an area from among the plurality of areas based on an amount of consumption of the first game point or the second game point, wherein the range of selectable areas differs for when the first game point is consumed to select the area and for when the second game point is consumed to select the area; and
      lottery processing in which a game content to be acquired by the player is selected by lottery, based on the drawing probability associated with the area selected.

2. The information processing device according to claim 1, wherein:
   in the lottery processing, the control unit causes the first game point or the second game point specified by the player to be consumed to select a quantity of game contents based on the amount of consumption of the first game point or the second game point by lottery, wherein the amount of consumption that can be consumed differs between consuming the first game point to perform a lottery and where consuming the second game point to perform a lottery.

3. The information processing device according to claim 1, wherein:
   in the lottery processing, with selection of a special game content as the game content to be acquired by the player as a trigger, the control unit changes the drawing probability associated with the area.

4. The information processing device according to claim 1, wherein:
   the control unit performs screen generation processing for generating a game screen in which information showing the degree of ease of acquiring a game content is displayed in association with each of the areas, based on the drawing probability associated with each of the areas.

5. The information processing device according to claim 1, wherein:
   in the area selection processing, the control unit selects the area randomly from among the plurality of areas when the first game point is consumed to select the area, and selects the area from among the plurality of areas in a preset selection order when the second game point is consumed to select the area.

6. A non-transitory computer-readable storage medium storing a game program for causing a computer to perform:
   processing for storing in a storage unit lottery information in which a drawing probability of a game content acquirable by lottery is set in association with each of a plurality of areas, and player information in which a first game point and a second game point that a player possesses are set in association with the player;
   area selection processing for causing the first game point or the second game point as specified by the player to be consumed to select an area from among the plurality of areas based on an amount of consumption of the first game point or the second game point, wherein the range of selectable areas differs for when the first game point is consumed to select the area and for when the second game point is consumed to select the area; and
   lottery processing for selecting a game content to be acquired by the player by lottery, based on the drawing probability associated with the area selected.

* * * * *